United States Patent [19]

Eriksen et al.

[11] Patent Number: 5,312,523

[45] Date of Patent: May 17, 1994

[54] ASSEMBLY FOR HEAT TREATING OF AN ENDLESS WIRE OR FELT

[75] Inventors: Gunnar Eriksen, Borgen; Sissel W. Olsen, Tranby, both of Norway

[73] Assignee: Kvaerner Eureka A/S, Tranby, Norway

[21] Appl. No.: 867,054

[22] Filed: Apr. 10, 1992

[30] Foreign Application Priority Data

Mar. 10, 1992 [NO] Norway .................................. 920930

[51] Int. Cl.⁵ .............................................. D21F 1/32
[52] U.S. Cl. .................................. 162/274; 162/359.1; 162/273; 34/111; 34/116; 34/146
[58] Field of Search .................... 162/274, 359.1, 375, 162/199, 200, 272, 273; 34/111, 116, 123, 146; 194/494

[56] References Cited

U.S. PATENT DOCUMENTS 4,495,714 1/1985 Eriksen ............................ 162/274
4,504,359 3/1985 Eriksen ............................ 162/274

*Primary Examiner*—W. Gary Jones
*Assistant Examiner*—Dean T. Nguyen
*Attorney, Agent, or Firm*—Young & Thompson

[57] ABSTRACT

In an assembly for heat treatment of an endless web, comprising two rotatable rollers of which at least one roller is heatable, there is provided between the two rotatable rollers a heatable glide surface, stationary relative to the direction of movement for the web, designed to make contact with the outside of the endless web that circulates in the web loop. In this manner the web may be heat treated simultaneously on both sides. The glide surface enables the heat treatment of both sides of the web without using rollers requiring excessive space, thus also permitting the heat treatment of very short endless webs, which previously have had to be reversed and driven twice through the assembly to achieve heat treatment on both sides.

3 Claims, 3 Drawing Sheets

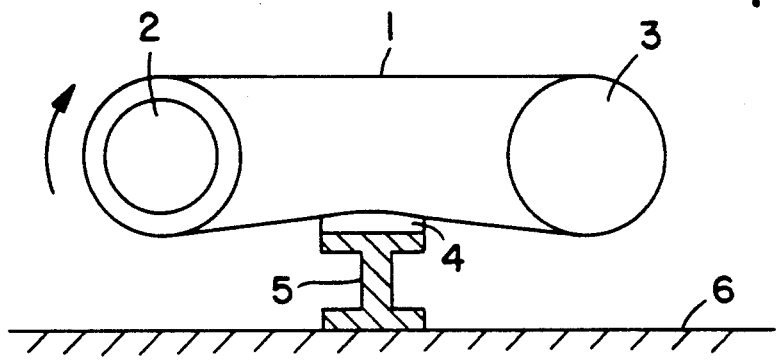
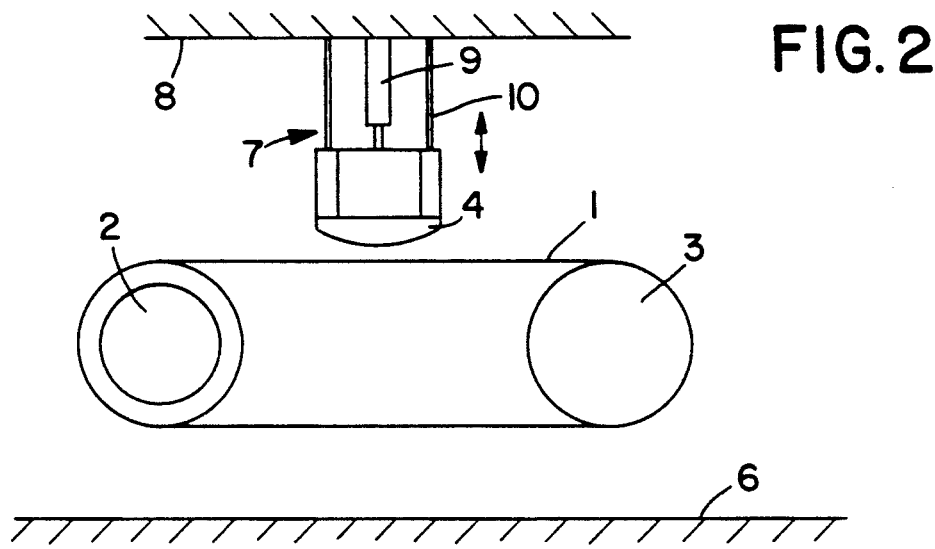
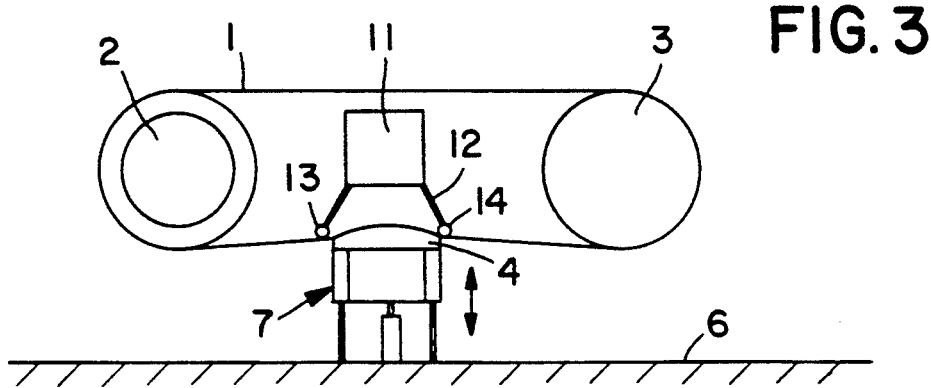

ASSEMBLY FOR HEAT TREATING OF AN ENDLESS WIRE OR FELT

The invention relates to an assembly for heat treating of an endless web, particularly a wire or felt for a paper machine, comprising two rotatable rollers that are spaced apart and arranged parallel to each other, at least one of the rotatable rollers being heatable.

The invention thus relates particularly to an assembly for heat treating of a wire or felt used in paper machines. Wires and felts used in paper machines are subjected to a special treatment in equipment wherein the felt/wire is stretched and fixed. Such stretching and fixing apparatus may comprise several different treatment units. The heat treatment of the felt or wire in such an apparatus is usually carried out by causing the felt/wire to pass as an endless web or belt over two rollers, at least one of which may be heated.

When a felt is "driven" against a heated roller, the objective, among others, is to obtain a smooth surface. It is very often desirable in this connection to obtain a smooth surface on both sides of the felt. Machines whereby this type of double treatment may be carried out are known. There are then used two heatable rollers, which may well be oil rollers, one of which is situated within the belt or web loop while the other works against the outside of the web.

One problem in this connection is that the outer roller must be the same size as the inner one. If not, the downward bending (deflection) of the roller will cause the formation of a dent or bulge in the felt. This is because the web's girth or circumferential measurement at the center of the roller is smaller than at the edges.

Due to size of the rollers—the rollers may well have a diameter of 1 meter or more—such a solution also entails a "minimum length" for the endless web that is much too great. In other words, the shortest felts that could be treated on such a machine would be too long relative to need. In addition, these machines represent a structural solution that is both expensive and complicated.

To avoid the use of such expensive machines, it is therefore common today to reverse the felts. This means that one side of the felt is first driven against the heatable roller within the belt loop, and then the felt is reversed—which is a relatively demanding operation, particularly with slightly thicker felts—and the felt is then driven against the roller with the inside out.

There is therefore a clear need for an assembly which is simple and inexpensive in its structural design and which enables heat treatment on both sides of the endless web, thus avoiding the need for reversal of the web. A specific prerequisite is that the exterior heating should be carried out with equipment that is simple in principle, requires minimum space in the machine, is sufficiently rigid to avoid downward bending, and is not overly expensive.

Therefore, according to the invention there is proposed an assembly for heat treating of an endless web, particularly a wire or a felt for a paper machine, comprising two rotatable rollers that are spaced apart and arranged parallel to each other, at least one of the rotatable rollers being heatable, characterized by a heatable glide surface, which is stationary relative to the direction of movement of the web, and is designed to make contact with the endless web on the outside of the web loop, between the two rotatable rollers.

It is thus proposed according to the invention that, instead of a rotating roller, there be used a stationary structure against which, for example, the felt may be drawn. The use of this type of glide- or contact surface solves in a simple and effective manner the space problem confronted today with existing machines for heat treating of felts. A roller that operates from the outside, as mentioned above, must have the same diameter as the inner heatable roller, and in order to obtain the requisite arc of angle, the outer roller must either have guide rollers provided for the felt, or be positioned in such a way as to urge the web inward into the belt loop area. In practice this would mean either that there would be insufficient space for such extra equipment, or that it would not be possible to meet the requirement for a "minimum length". As a desirable "minimum length" there is generally a requirement of 10–12 meter, and on this basis—taking into consideration that the rollers have a rather large diameter—it will be understood that space conditions could be too inadequate for an exterior roller with accessories.

It is particularly advantageous for the glide surface to have a convex curvature in the direction of web travel, thereby enabling attainment of a certain degree of surface tension, which will improve the heating contact.

The glide- or contact surface may advantageously be mounted so as to permit movement in a direction toward and away from the web, thereby enabling the surface to be brought from a passive position to an active position.

It would also be advantageous to provide the assembly with holder means for the web, these holders then being positioned within the loop of the web above the contact surface. The holders may have the form of rod-like elements which require relatively little space, and which are supported by means of braces against a transverse member or beam within the loop of the web, or they may be placed on a optional air box within the web loop.

A particularly advantageous embodiment form of the invention is one where the contact surface is mounted on a cart. This may then be driven away when it is not needed. Such a cart may be a known per se service vehicle, employed in connection with the heatable roller, or it may be an independent cart or carriage.

The invention will now be explained in greater detail with reference to the figures, wherein the schematic drawings show various embodiments of the inventive concept.

BRIEF DESCRIPTION OF THE DRAWINGS

FIG. 1 indicates very generally how the invention may be realized,

FIG. 2 shows a glide surface designed for contact with the upper side of a web loop, FIG. 3 shows an application of the contact surface against the under side of a web loop.

In FIG. 1 is shown an assembly for heat treating of an endless web, in this case, for example, a continuous felt 1 for use in a paper machine. The assembly comprises two rotatable rollers that are spaced apart and arranged parallel to each other, in this example a rotatable heatable roller 2 and a rotatable roller 3. Roller 3 may be movably mounted for movement toward and away from roller 2, so that it functions as a tension roller. With the aid of drive means, not shown, roller 2 is actuated for rotation, as indicated by the arrow.

Figure 4:
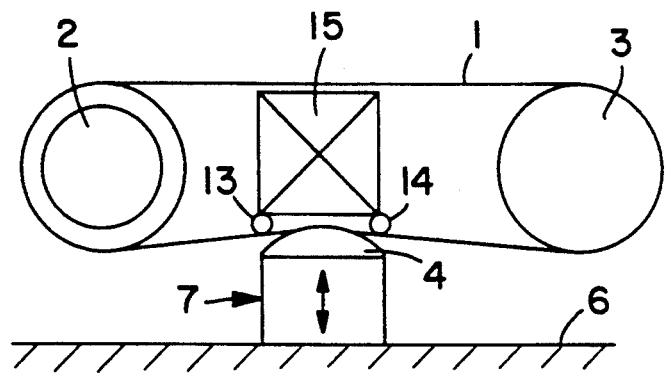
FIG. 4 shows the contact surface used in connection with an air box within the web loop.

A heatable glide surface 4 is mounted below the web loop, on a solid support beam 5 on the floor 6. In this manner, one may simultaneously heat treat the outside as well as the inside (relative to the web loop) of felt 1, the inside of felt 1 being heated with the aid of roller 2, while the outside is heated by glide surface 4.

Since the rotatable rollers and glide surface represent the same basic components in all figures, the same reference numerals are used in FIG. 2-8 as in FIG. 1. This applies also to floor 6.

In FIG. 2 is shown a possible embodiment form wherein glide surface 4 is positioned above the web loop. Glide surface 4 is mounted on support means 7 whereby it is suspended from the ceiling 8. Support means 7 comprises power means in the form of a working cylinder 9 and guide rails 10, which enable the raising and lowering of glide surface 4 toward and away from felt 1.

In the embodiment shown in FIG. 3, the glide surface is mounted on support means 7, whereby the glide surface is retained above the floor 6 and thus operates on the under side of the web loop, in the same manner as in FIG. 1. In the web loop there is indicated a cantilever beam 11 from which holder means 13, 14 are mounted with the aid of braces 12. These holder means, having the form, for example, of relatively slim rods, serve to retain felt 1 in contact with glide surface 4.

In the embodiment in FIG. 4, the construction is basically the same as in FIG. 3. Instead of the cantilever beam 11, there is shown here an air box member 15, which is used for hot air treatment of felt 1, and the holder means 13,14 are placed along the under side of air box member 15. The design of support means 7 is even more simplified in FIG. 4, compared with FIGS. 2 and 3, and the same is true for the subsequent FIGS. 5-8.

Figure 5:
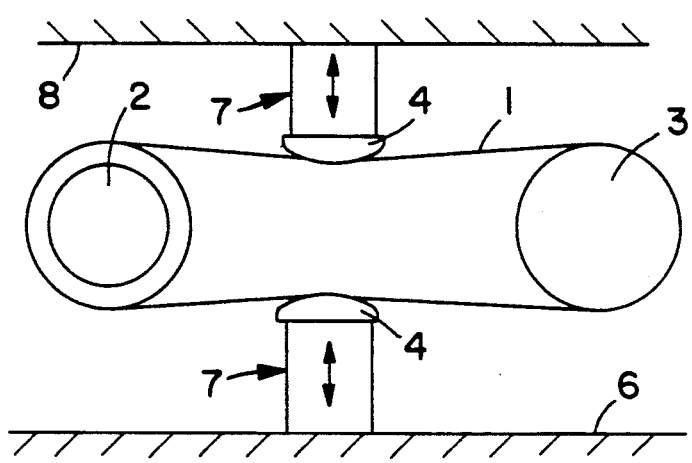
FIG. 5 shows how a contact surface may be applied to both the upper side and the under side of the web loop.

In FIG. 5 there is shown an embodiment where a glide surface 4 is placed on both the upper side and the under side of the web loop formed by felt 1. Both the upper and lower glide surfaces 4 are mounted on a suitable support means 7, on the ceiling 8 and floor 6, respectively.

Figure 6:
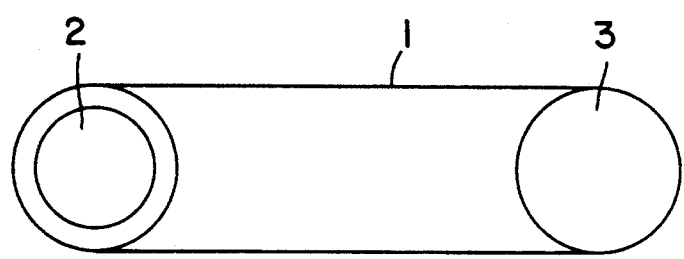
FIG. 6 shows an embodiment where the contact surface is disposed within a pit in the floor.
Figure 7:
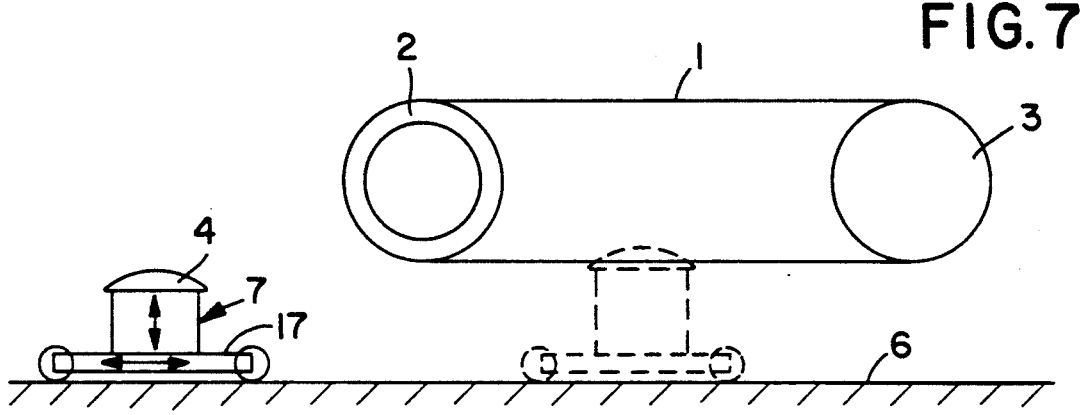
FIG. 7 shows an embodiment where the contact surface is mounted on a cart.

In the embodiment in FIG. 6, glide surface 4 is mounted on a support means 7 which has been sunk into the floor 6 in a pit 16. In FIG. 7 glide surface 4 is mounted on support means 7 on a cart 17. By this means the glide surface may be removed totally from the rest of the machine. The operational position for glide surface 4 is indicated with broken lines in the drawing.

Figure 8:
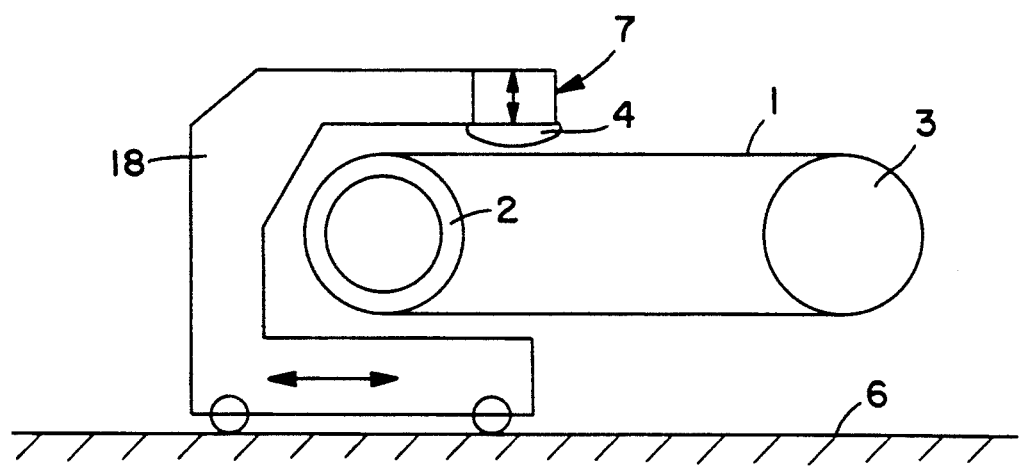
FIG. 8 shows an embodiment where the contact surface is intended for placement on a so-called service vehicle.

In FIG. 8 glide surface 4 is also positioned on a cart with the aid of support means 7. In FIG. 8 this has the form of a so-called service vehicle 18. Viewed from the side, it is a C-shaped vehicle which may carry various types of equipment such as, for example, a burner, an application cylinder for chemicals, a washing cylinder, etc. (not shown).

As will be noted from the drawings, it is common to all embodiments that the stationary heated glide surface presses against an outer surface of the web to deflect the web, that is, to impart to the web a single outwardly concave arcuate outer surface over all that portion of the web in contact with the guide surface.

Having described our invention, we claim:

1. An assembly for heat treating an endless papermaking wire or felt, comprising two rotatable rollers spaced apart and positioned parallel to each other, at least one of the rollers being heated, the endless wire or felt being trained about the two rollers, and a heated glide surface which is stationary with respect to the direction of movement of the felt/wire and presses against an outer surface of the felt/wire to deflect the felt/wire inwardly between said rollers by imparting to the felt/wire a single outwardly concave arcuate outer surface over all that portion of the felt/wire in contact with the glide surface.

2. An assembly as claimed in claim 1, with power means for moving the glide surface in a direction inwardly of the felt/wire.

3. An assembly as claimed in claim 1, with holder means pressed against the inside of the felt/wire at the ends of said glide surface with respect to the direction of movement of the felt/wire to retain the felt/wire in contact with the glide surface.

* * * * *